US009357097B1

(12) United States Patent
Tanaka (10) Patent No.: US 9,357,097 B1
(45) Date of Patent: May 31, 2016

(54) OPTICAL SCANNING DEVICE AND IMAGE FORMING APPARATUS

(71) Applicant: CANON KABUSHIKI KAISHA, Tokyo (JP)

(72) Inventor: Shunsuke Tanaka, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/954,058

(22) Filed: Nov. 30, 2015

(30) Foreign Application Priority Data

Dec. 2, 2014 (JP) .................................. 2014-244158

(51) Int. Cl.
| | |
|---|---|
| *G03G 15/04* | (2006.01) |
| *H04N 1/113* | (2006.01) |
| *H04N 1/024* | (2006.01) |
| *H04N 1/10* | (2006.01) |
| *G02B 26/12* | (2006.01) |
| *G03G 15/043* | (2006.01) |

(52) U.S. Cl.
CPC .............. *H04N 1/113* (2013.01); *G02B 26/122* (2013.01); *G02B 26/127* (2013.01); *G03G 15/043* (2013.01); *H04N 1/02418* (2013.01); *H04N 1/1013* (2013.01); *H04N 2201/0082* (2013.01); *H04N 2201/0093* (2013.01)

(58) Field of Classification Search
CPC .... H04N 1/113; G03G 15/043; G03G 15/221
USPC ............................................. 399/4, 118, 220
See application file for complete search history.

(56) References Cited

U.S. PATENT DOCUMENTS

| | | | | |
|---|---|---|---|---|
| 5,913,077 | A * | 6/1999 | Sato ....................... | G03B 17/50 358/506 |
| 6,249,615 | B1 * | 6/2001 | Kunishige .............. | H04N 1/401 358/461 |
| 7,515,169 | B2 | 4/2009 | Komiya et al. ................ | 347/247 |
| 8,411,317 | B2 * | 4/2013 | Morikawa .......... | G02B 17/0647 358/1.15 |

FOREIGN PATENT DOCUMENTS

| | | |
|---|---|---|
| JP | 11-187219 | 7/1999 |
| JP | 2003-222811 | 8/2003 |
| JP | 2005-041171 | 2/2005 |
| JP | 2006-248109 | 9/2006 |

* cited by examiner

*Primary Examiner* — Hoang Ngo
(74) *Attorney, Agent, or Firm* — Fitzpatrick, Cella, Harper & Scinto (57) ABSTRACT

A scanning optical device includes a light source for emitting laser light, a rotatable polygonal mirror for deflecting the laser light emitted from the light source, a detecting portion for outputting a detection signal on the basis of incidence of the laser light deflected by the rotatable polygonal mirror on a light receiving surface, and an outputting portion for outputting a driving signal for driving the light source on the basis of output timing of the detection signal and an output period in which the detection signal is outputted. The laser light is emitted depending on an image signal inputted at timing based on output timing of the driving signal. When the output period is longer than a first period, the outputting portion outputs the driving signal on the basis of the output timing of the detection signal and a fixed second period.

11 Claims, 10 Drawing Sheets

OPTICAL SCANNING DEVICE AND IMAGE FORMING APPARATUS

FIELD OF THE INVENTION AND RELATED ART

The present invention relates to a scanning optical device used in an image forming apparatus, having a function of forming an image on a sheet or the like as a transfer material (recording material), such as a laser beam printer, a copying machine or a facsimile machine, and relates to the image forming apparatus including the scanning optical device.

A conventional image forming apparatus such as the laser beam printer forms the image on a surface-to-be-scanned by the following operation of a scanning optical device mounted therein. The scanning optical device optically modulates laser light flux emitted from a light source depending on an image signal, and then a surface-to-be-scanned is scanned with the optically modulated laser light flux by a deflecting device including, e.g., a rotatable polygonal mirror. The laser light flux deflected by the deflecting device is subjected to scanning in a state in which the laser light flux is formed in a spot shape on a photosensitive drum surface which is the surface-to-be-scanned by a scanning lens such as imaging optical system having an fθ characteristic. Timing of writing of the laser light flux on the surface-to-be-scanned is controlled on the basis of a synchronizing signal outputted by a writing position synchronizing signal detecting means provided on the surface-to-be-scanned. In many image forming apparatuses, control is effected so that when falling of the signal outputted from a BD sensor which is the writing position synchronizing signal detecting means is detected, image writing is made after a lapse of a predetermined time (e.g., Japanese Laid-Open Patent Application (JP-A) 2003-222811). However, due to a variation in reflectance of each of planes of polarization of the deflecting device or a variation in size or the like of each of the planes of polarization, a light quantity of the laser light flux reflected every plane of polarization changes in some cases. In the case where a variation generates in light quantity inputted into the BD sensor, deviation in writing position detection timing (BD detection timing) corresponding to each scanning line along a main scanning direction in a region in which the image on the surface-to-be-scanned is recorded (hereinafter referred to as an image recording surface) generates. As a result, deviation in printing position on the image recording surface with respect to the main scanning direction generates.

Therefore, the writing position is determined on the basis of a center time between falling and rising of the synchronizing signal outputted from the writing position synchronizing signal detecting means (e.g., JP-A Hei 11-187219). By employing such a constitution, even in the case where the variation in light quantity inputted into the writing position synchronizing signal detecting means generates due to the variation in reflectance, since or the like of each of the planes of polarization of the deflecting device, the deviation in printing position with respect to the main scanning direction is prevented from generating.

However, in the conventional constitution, the printing position deviation with respect to the main scanning direction does not generate even in the case where the light quantity inputted into the writing position synchronizing signal detecting means generates, but the following problem arises. In order to detect a central time between the falling and rising of the synchronizing signal, there is a need to use a measuring means for measuring a time from the falling to the rising of the synchronizing signal, i.e., a width of a low level of the synchronizing signal (hereinafter also referred to as a low-width time). The measuring means for measuring the low-width time is constituted by a counter operating with a high-speed clock and a time measuring memory for recording (storing) a count value of the counter. However, a storing capacity of the time measuring memory has a limit, and therefore in the case where a time from the falling to the rising of the synchronizing signal is not less than a predetermined time, the low-width time cannot be measured.

Such a situation that the low-width time of the synchronizing signal cannot be measured can occur in a state in which a rotational speed of a rotatable polygonal mirror is slow. This is because in the state in which the rotational speed of the rotatable polygonal mirror is slow, a time required for passing of the laser light flux through the writing position synchronizing signal detecting means becomes long. The state in which the rotational speed of the rotatable polygonal mirror is slow corresponds to, e.g., a state from a state in which the rotatable polygonal mirror is stopped until acceleration control to a target speed is effected partway. In a state in which the low-width time of the synchronizing signal cannot be measured, it would be considered that a means for increasing and decreasing the surface of the rotatable polygonal mirror by predictive control is employed, but the control is complicated and in addition, there is a problem that smooth acceleration control to the target speed cannot be made.

SUMMARY OF THE INVENTION

The present invention has been accomplished in the above-described circumstances. A principal object of the present invention is to provide a scanning optical device capable of effecting control of a rotational speed of a rotatable polygonal mirror in a broad range from a low speed to a high speed in a simple constitution without increasing a capacity of a storing means.

According to an aspect of the present invention, there is provided a scanning optical device comprising: a light source for emitting laser light; a rotatable polygonal mirror for deflecting the laser light emitted from the light source; a detecting portion for outputting a detection signal on the basis of incidence of the laser light deflected by the rotatable polygonal mirror on a light receiving surface; and an outputting portion for outputting a driving signal for driving the light source on the basis of output timing of the detection signal and an output period in which the detection signal is outputted, wherein the laser light is emitted depending on an image signal inputted at timing based on output timing of the driving signal, wherein when the output period is longer than a first period, the outputting portion outputs the driving signal on the basis of the output timing of the detection signal and a fixed second period.

Further features of the present invention will become apparent from the following description of exemplary embodiments with reference to the attached drawings.

BRIEF DESCRIPTION OF THE DRAWINGS

In FIG. 2, (a) is a schematic view showing a structure of a scanning optical device in Embodiments 1 to 4o, and (b) is an enlarged view in the neighborhood of a BD sensor of the scanning optical device.

In FIG. 4, (a) and (b) are schematic views each showing a state of spot scanning on a light receiving surface of the BD sensor in Embodiments 1 to 4.

In FIG. 6, (a) to (d) are timing charts each showing the BD detection signal and the laser driving signal in Embodiment 1.

In FIG. 7, (a) to (d) are timing charts each showing the BD detection signal and the laser driving signal in Embodiment 2.

In FIG. 9, (a) to (d) are timing charts each showing the BD detection signal and the laser driving signal in Embodiment 3.

In FIG. 10, (a) to (d) are timing charts each showing the BD detection signal and the laser driving signal in Embodiment 4.

DESCRIPTION OF THE EMBODIMENTS

Embodiments of the present invention will be described in detail with reference to the drawings.

Embodiment 1

(Image Forming Apparatus)

Figure 1:
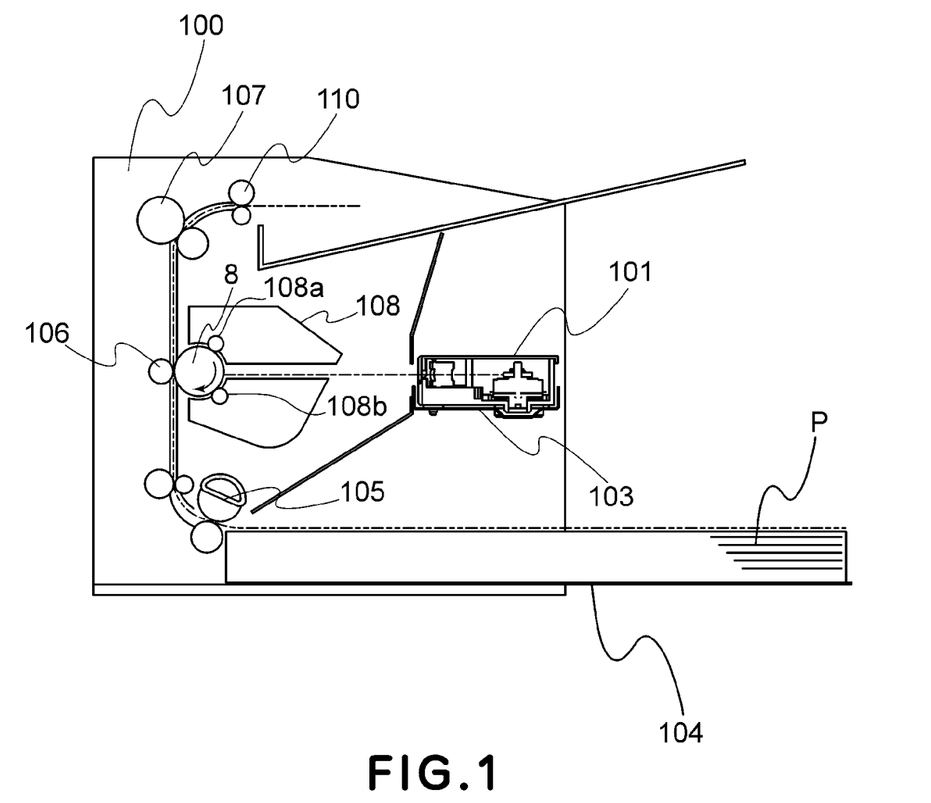
FIG. 1 is a schematic view showing a structure of an image forming apparatus in Embodiments 1 to 4.

FIG. 1 is a schematic view showing a structure of an image forming apparatus 100. A scanning optical device 101 described later is placed on an optical table 103. The optical table 103 is a part of a casing of the image forming apparatus 100. The image forming apparatus 100 includes a process cartridge 108, a sheet feeding portion 104 for stacking a recording material (sheet) P, a sheet feeding roller 105, a transfer roller (transfer means) 106 and a fixing device 107. The process cartridge 108 includes a photosensitive drum (image bearing member) 8, a charging roller (charging means) 108a and a developing roller (develop means) 108b. The transfer roller (transfer means) 106 contacts the photosensitive drum 8 to form a transfer nip.

An image forming process will be described. The image forming process is performed while rotating the photosensitive drum 1 about a rotation shaft thereof in the clockwise direction (arrow direction in FIG. 1). First, the surface of the photosensitive drum 8 is electrically charged by the charging roller 108a. Then, the surface of the charged photosensitive drum 8 is irradiated and scanned with laser light from the scanning optical device 101, so that a latent image is formed on the photosensitive drum (image bearing member) 8. The scanning optical device 101 emits the laser light to the photosensitive drum 8 by driving a semiconductor laser which is a light source of a semiconductor laser unit 1 described later in accordance with a laser driving signal depending on an inputted image signal.

Then, a toner is deposited by the developing roller 108 on the surface of the photosensitive drum 8 on which the latent image is formed, so that the latent image is developed with the toner to form a toner image on the surface of the photosensitive drum 8. The recording material P is fed from the sheet feeding portion 104 by the sheet feeding roller 105 to enter the transfer nip, so that the toner image formed on the photosensitive drum 8 is transferred onto the recording material P by the transfer roller 106. Thereafter, the sheet (recording material) P is fed from the transfer nip to the fixing device 107 and is heated and pressed by the fixing device 107 to fix the (unfixed) toner image on the sheet P. Finally, the sheet P on which the toner image is fixed is discharged by a discharging roller 110 onto a stacking portion provided at an outer portion (upper portion of an apparatus main assembly) of the image forming apparatus 100. In FIG. 1, a chain double dashed line represents a feeding path of the recording material (sheet) P. The structure of the image forming apparatus 100 is not limited to the above-described structure.

(Scanning Optical Device)

Figure 2:
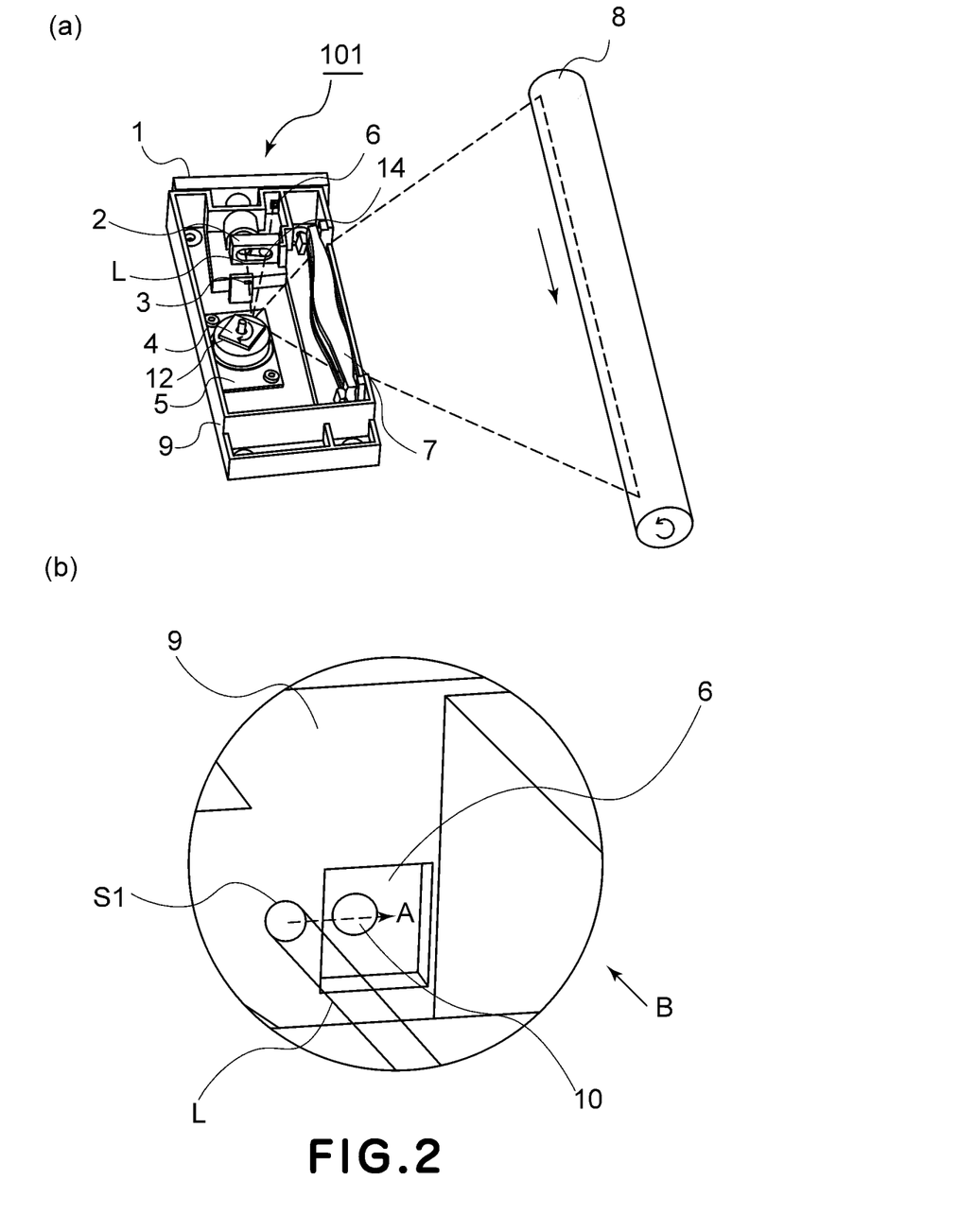

In FIG. 2, (a) is an illustration of the scanning optical device 101 in this embodiment. The scanning optical device 101 includes the semiconductor laser unit 1 and a composite anamorphic collimator lens 2. The semiconductor laser unit 1 emits a laser light flux L. The composite anamorphic collimator lens 2 is a lens prepared by integrally molding a collimator lens, a cylindrical lens and a writing position signal detecting lens (hereinafter referred to as a BD lens) 14. The scanning optical device 101 further includes an aperture stop 3, a rotatable polygonal mirror 4, a reflecting surface 12 of the rotatable polygonal mirror 4 and a deflecting device 5 for rotationally driving the rotatable polygonal mirror 4. Further, the scanning optical device 101 includes a BD sensor 6 which is a detecting means for detecting the laser light flux and outputting a writing position synchronizing signal, an fθ lens (scanning lens) 7 and an optical box 9. The optical box 9 accommodates the above-described optical members. The reflecting surface of the rotatable polygonal mirror 4 includes four surfaces, but the number of surfaces of the reflecting surface 12 is not limited to 4.

The laser light flux L emitted from the semiconductor laser unit 1 is changed into substantially parallel light or converging light with respect to a main scan direction described later and is changed into the converging light with respect to a sub-scan direction described later. Then, the laser light flux L passes through the aperture stop 3 and thus a width of the laser light flux L is limited, so that the laser light flux L forms an image on the deflecting surface 12 in a focal line shape extending long in the main scan direction. Then, the laser light flux L is deflected by rotating the rotatable polygonal mirror 4. The laser light flux L reflected by the reflecting surface 12 of the rotatable polygonal mirror 4 is circuit on the BD lens 14 of the composite anamorphic collimator lens 2. The laser light flux L passes through the BE lens 14 enters the BD sensor 6. At this time, the BD sensor 6 detects the laser light flux L. The BD sensor 6 outputs a BD detection signal which is the writing position synchronizing signal at timing of detection of the laser light flux L as BD detection timing. In this way, the BD sensor 6 outputs the BD detection signal on the basis of incidence of the laser light, deflected by the rotatable polygonal mirror 4, on a light receiving surface.

Then, the laser light flux L enters the fθ lens 7. The fθ lens 7 focuses the laser light flux L so that the laser light flux 7 forms a spot on the develop 8 and is designed so that a scanning speed of the spot is maintained at an equal speed. In order to obtain a characteristic of such an fθ lens, the fθ lens is formed with an aspherical lens. The laser light flux L passed through the fθ lens 7 forms the image on the photosensitive drum 8 and then the surface of the photosensitive drum 8 is scanned with the laser light flux L in an arrow direction in FIG. 2 with rotation of the rotatable polygonal mirror 4. The laser light flux L is deflected by the rotation of the rotatable polygonal mirror 4, so that scanning of the surface of the photosensitive drum 8 with the laser light flux L is made. The scanning of the surface of the photosensitive drum 8 with the laser light flux L is referred to as main scanning, and the direction (arrow direction in FIG. 27) in which the main scanning is made is the main scan direction. The photosensitive drum 8 has a cylindrical shape and is rotationally driven about an axis of the cylindrical photosensitive drum 8, so that the scanning of the photosensitive drum 8 in a rotational direction (counterclockwise direction in (a) of FIG. 2) is made. The scanning of the photosensitive drum 8 in the rotational direction is referred to as sub-scanning, and a direction of the sub-scanning is the sub-scan direction. As described above, an electrostatic latent image is formed on the surface of the photosensitive drum 8.

In FIG. 2, (b) is an enlarged view of the neighborhood of the BD sensor 6. The laser light flux L passed through the BD lens 14 is focused by the BD lens 14 so as to form a circular spot S1. The spot S1 is scanned in an arrow direction in (b) of FIG. 2. Timing when the scanned spot S1 passes through the light receiving surface 10 of the BD sensor 6 is BD detection timing.

(Laser Driving Signal)

Figure 3:
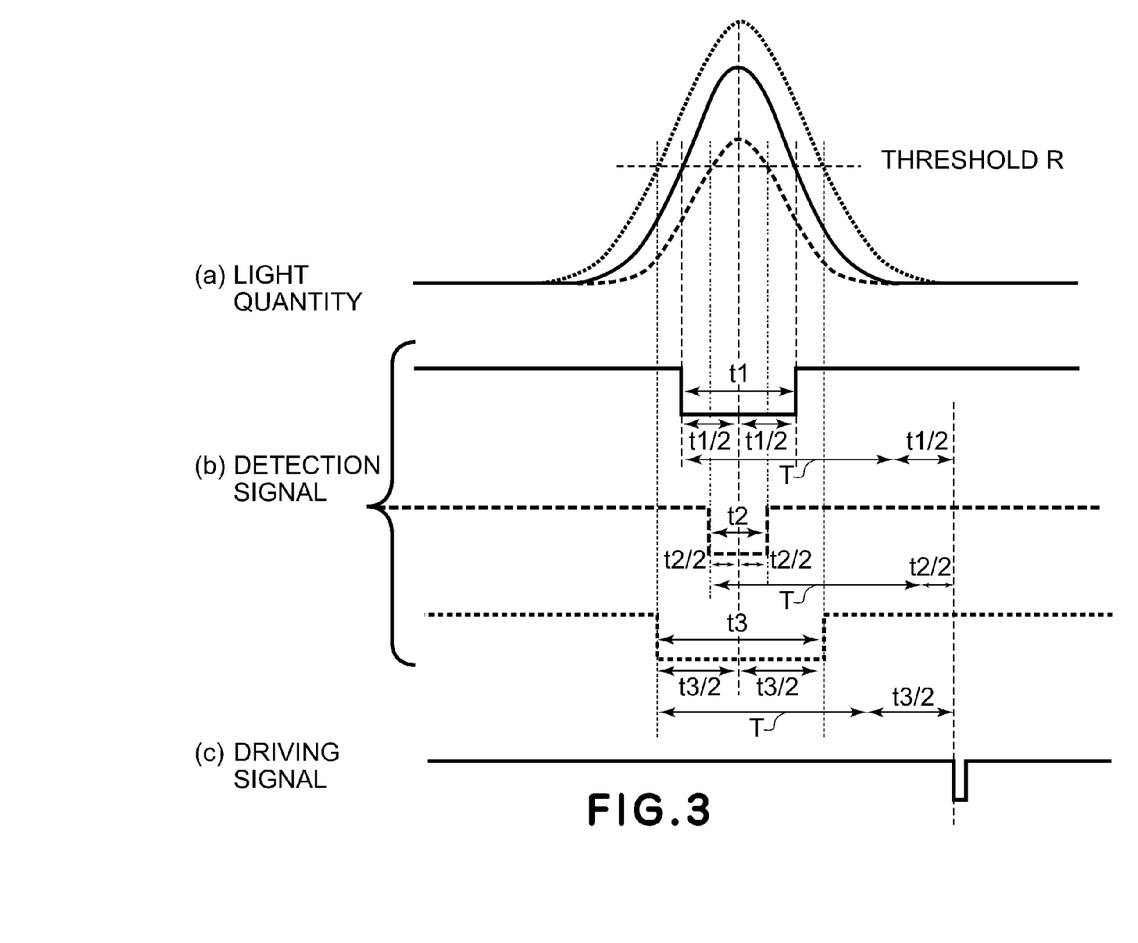
FIG. 3 is a timing chart showing a BD incident light quantity ((a)), a BD detection signal ((b)) and a laser driving signal ((c)) in Embodiments 1 and 2.
Figure 4:
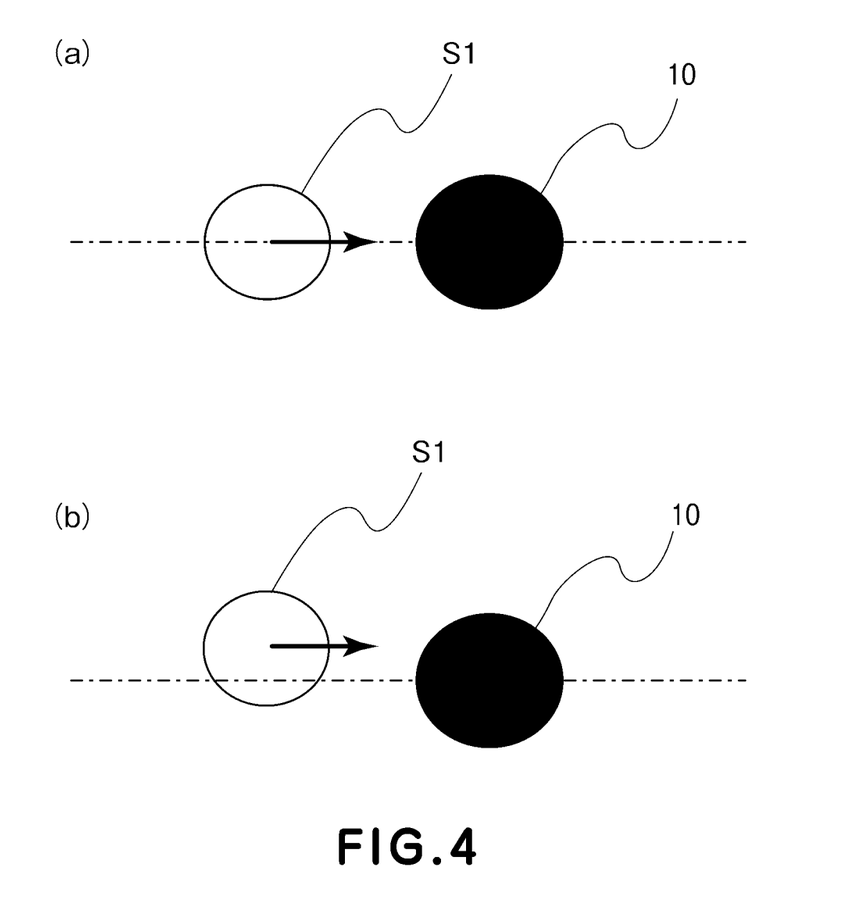
Figure 5:
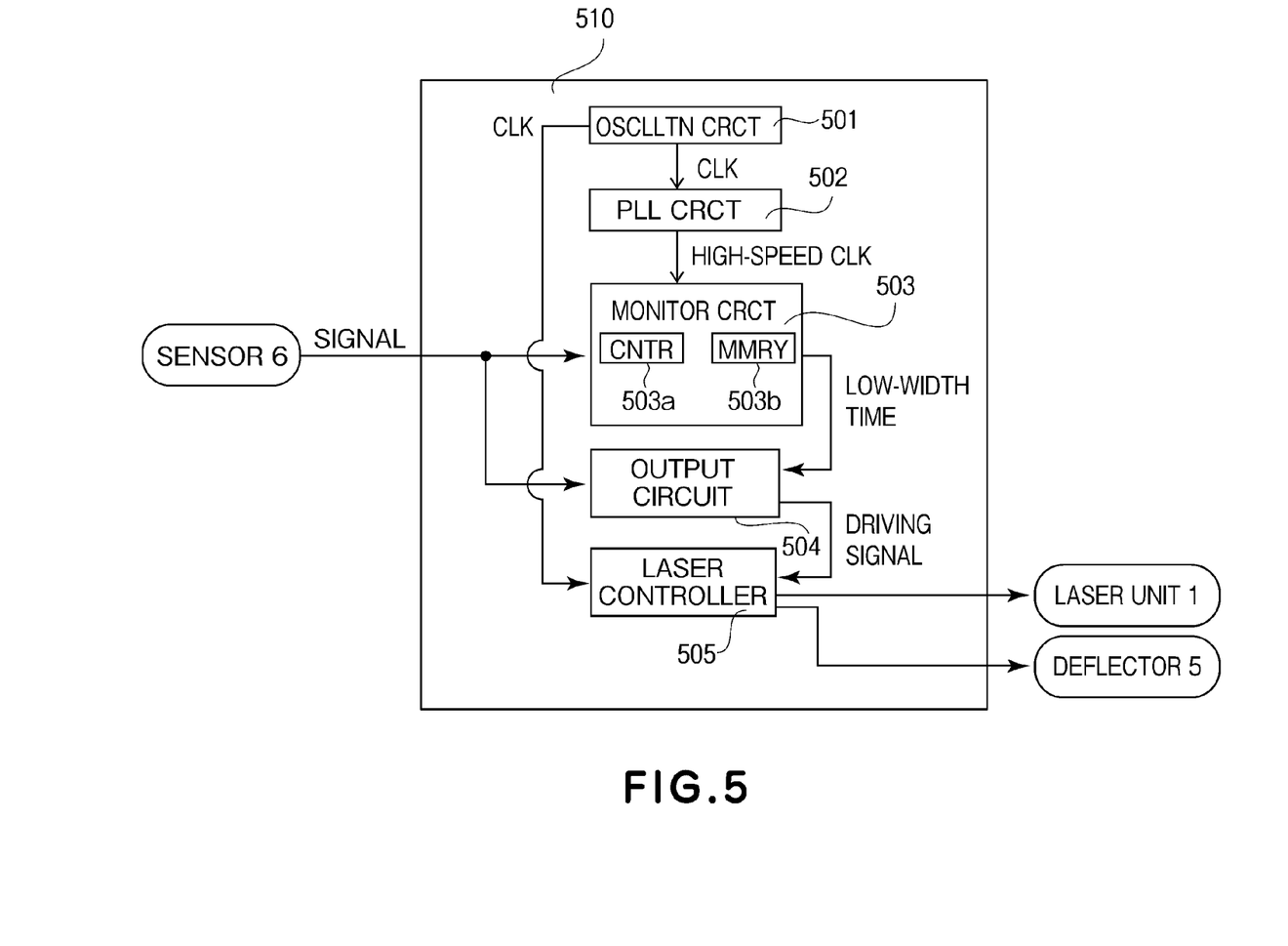
FIG. 5 is a block diagram showing a laser driving controller in Embodiments 1 to 4.

Using FIGS. 3 to 5, a process for determining output timing of a laser driving signal and a function of the laser driving signal will be described. In FIG. 3, (a) shows a light quantity (BD incident light quantity) of the laser light flux L entering the BD sensor 6, (b) shows the BD detection signal outputted by the BD sensor 6, and (c) shows the laser driving signal outputted from a laser driving signal outputting circuit 504. In (a) and (b) of FIG. 3, a solid line, a broken line and a dotted line show states different in BD incident light quantity, and a relationship of: LQ (dotted line)>LQ (solid line)>LQ (broken line) is satisfied.

As shown in (a) of FIG. 3, when the BD incident light quantity is not less than a predetermined threshold (level) R, a level of the BD detection signal outputted from the BD sensor 6 changes from a high level (H) to a low level (L). Then, when the BD incident light quantity is less than the threshold R, the level of the BD detection signal returns from the low level to the high level. An output period from a time when the BD detection signal becomes the low level until the level returns to the high level is referred to as a low-width time, and is indicated in (b) of FIG. 3 by t1 in the case of the solid line, t2 in the case of the broken line and t3 in the case of the dotted line. The low-width time of the BD detection signal is a time depending on a time required for passing of the laser light flux L through the light receiving surface 10 of the BD sensor 6. Incidentally, such a constitution that the level of the BD detection signal becomes the high level until the BD detection signal which is not less than the threshold R becomes smaller than the threshold R may also be employed. The low-width time varies depending on various parameters such as a rotational speed of the rotatable polygonal mirror 4 rotationally driven by the deflecting device 5 and the light quantity of the laser light flux L.

The function of the laser driving signal will be described. The laser driving signal is a signal for determining light emission timing of the semiconductor laser unit 1 emitting the laser light flux L and image writing timing on the surface of the photosensitive drum 8 which is a surface-to-be-scanned. Control of the light emission timing of the semiconductor laser unit 1 and control of the image writing timing are effected in synchronism with output timing of the laser driving signal. Also control of the rotational speed of the rotatable polygonal mirror 4 is effected on the basis of the laser driving signal. The control of the rotational speed of the rotatable polygonal mirror 4 is effected so that the rotational speed of the rotatable polygonal mirror 4 is a desired rotational speed by detection of the rotational speed of the rotatable polygonal mirror 4 from an output period of the laser driving signal. In other words, a motor (driving means) for driving the rotatable polygonal mirror 4 is controlled on the basis of the output period of the laser driving signal. In the case where the output period of the laser driving signal is longer than a predetermined period, the rotational speed of the rotatable polygonal mirror is in a state of being slower than the desired rotational speed, and therefore the rotational speed of the rotatable polygonal mirror 4 is accelerated by increasing the number of rotations of the motor. In the case where the output period of the laser driving signal is shorter than the predetermined period, the rotational speed of the rotatable polygonal mirror 4 is in a state of being higher than the desired rotational speed, and therefore the rotational speed of the rotatable polygonal mirror 4 is decreased by lowering the number of rotations of the motor.

Output timing of the laser driving signal will be described. The laser driving signal is outputted at timing of a lapse of a time, from falling timing of the BD detection signal, obtained by adding half of the low-width time to a delay time T. The delay time T is fixed time independently of an incident light quantity into the BD sensor 6. The delay time T may only be required to be a time not less than a predetermined time (maximum low-width time tlim described later) (T≤tlim). The output timing of the laser driving signal represented by each of the solid line, the broken line and the dotted line in FIG. 3 is determined in the following manner. In the case where the BD incident light quantity is represented by the solid line, the laser driving signal is outputted after a lapse of the delay time T+(t1/2) from the falling timing of the BD detection signal indicated by the solid line. In the case where the BD incident light quantity is represented by the broken line, the laser driving signal is outputted after a lapse of the delay time T+(t2/2) from the falling timing of the BD detection signal indicated by the broken line. In the case where the BD incident light quantity is represented by the dotted line, the laser driving signal is outputted after a lapse of the delay time T+(t3/2) from the falling timing of the BD detection signal indicated by the dotted line.

Here, as shown in (c) of FIG. 3, each of the BD incident light quantity indicated by the solid line, the broken line and the dotted line and the delay time of the laser driving signal determined from the associated BD incident light quantity is the same timing when the delay time T elapsed on the basis of a central position of the associated incident light quantity. That is, at the timing when the delay time T elapsed from the central position of the incident light quantity, the laser driving signal is outputted, so that irrespective of a magnitude of the BD incident light quantity, the laser driving signal can be outputted. As shown in (c) of FIG. 3, the laser driving signal is outputted with a predetermined delay time (T) from a central position of the BD incident light quantity irrespective of the magnitude of the BD incident light quantity. Here, the central position of the BD incident light quantity is also a central position of the BD detection signal and is a position of timing of ½ (center) between a falling timing and a rising timing of the BD detection signal.

The cause of a variation in input light quantity of the BD sensor 6 as indicated by the solid line, the broken line and the dotted line will be described using FIG. 4. In FIG. 4, (a) and (b) are schematic views each showing a state of (b) of FIG. 2 as seen from an arrow B direction and showing a state in which the light receiving surface 10 of the BD sensor 6 indicated by a solid black circle is scanned with a circular spot S1. In (a) and (b) of FIG. 4, arrows are the same as the arrow A in (b) of FIG. 2, i.e., show a movement direction of the spot S1 which is a scanning direction of the laser light flux L. If the respective surfaces of the reflecting surface 12 of the rotatable polygonal mirror 4 are in such an ideal state that there is no inclination with respect to the rotational axis, a center of the spot S1 passes through the center of the light receiving surface 10. However, when an inclination amount of the reflecting surface 12 is different among the respective surfaces, the position of the spot S1 passing through the light receiving surface 10 deviates in the sub-scan direction as shown in (b) of FIG. 4 in some cases. In the case where inclination of the reflecting surface 12 of the rotatable polygonal mirror 4 generates, the deviation in the sub-scan direction with respect to a plurality (4 in this embodiment) of surfaces of the reflecting surface 12 of the rotatable polygonal mirror 4 also varies depending on the respective reflecting surfaces. When the position of the spot S1 deviates in the sub-scan direction, the center of the spot S1 does not pass through the center of the light receiving surface 10, so that an entire region of the spot S1 does not enter the light receiving surface 10 and thus an inputted light quantity into the BD sensor 6 becomes small. In this way, in the case where there is an inclination amount with respect to the rotational axis of the reflecting surface 12 of the rotatable polygonal mirror 4, a variation in incident light quantity on the light receiving surface 10 of the BD sensor 6 generates. Also, due to a variation in reflectance at each of surfaces of the reflecting surface 12 of the rotatable polygonal mirror 4, the variation in incident light quantity into the BD sensor 6 generates. Incidentally, in FIG. 4, the spot S1 is illustrated as a smaller circle than the light receiving surface 10, but a similar phenomenon generates even when the relationship of the areas is reverse.

(Laser Control Portion)

A laser control portion 510 will be described using FIG. 5. The laser controller 510 includes an oscillating circuit 501, a PLL (phase locked loop) circuit 502, a low-width time monitoring circuit 503, a laser driving signal output circuit 504 and a laser controller 505. The laser controller 510 is also a part of a function of an unshown controller of the image forming apparatus in (a) of FIG. 2. The low-width time monitoring circuit 503 includes a counter 503a and a memory 503b which is a storing means. The counter 503a performs a count-up operation in synchronism with a high-speed CLK signal described later during a period in which the BD detection signal outputted from the BD sensor 6 is at a low level, and stores a count value in the memory 503b in synchronism with the high-speed CLK signal. As described above, there is a limit in storing capacity of the memory 503b of the low-width time monitoring circuit 503 which is a measuring means. For this reason, in the case where a time from the falling to the rising of the BD detection signal is longer than a predetermined time (tlim described later), the low-width time monitoring circuit 503 cannot measure the low-width time of the BD detection signal. There is a liability that the situation in which the low-width time of the BD detection signal cannot be measured generates in a state in which the rotational speed of the rotatable polygonal mirror 4 is slow. This is because the state in which the rotational speed of the rotatable polygonal mirror 4 is low corresponds to form a state in which the rotatable polygonal mirror 4 is stopped to a state in which acceleration to the target speed is controlled partway, i.e., a preparatory period until the image forming operation is executed, for example.

The oscillating circuit 501 outputs a clock signal (CLK signal) to the PLL circuit 502 and the laser controller 505. The PLL circuit 502 converts the CLK signal inputted from the oscillating circuit 501 at high speed, so that the high-speed CLK signal is outputted to the low-width time monitoring circuit 503. The low-width time monitoring circuit 503 operates in accordance with the high-speed CLK signal inputted from the PLL circuit 502. The high-speed CLK signal is a signal of 400 MHz, for example. The low-width time monitoring circuit 503 monitors a change in BD detection signal at a clock cycle (period) of the high-speed CLK signal of 400 MHz inputted from the PLL circuit 502. As a result, the low-width time of the BD detection signal can be detected with resolving power of about 2.5 nsec. A longest time (tlim described later) in which the low-width time of the BD detection signal can be detected depends on the capacity of the memory 503b mounted in the low-width time monitoring circuit 503 and is determined depending on the capacity of the memory 503b. The low-width time monitoring circuit 503 outputs the low-width time of the measured BD detection signal to the laser driving signal outputting circuit 504.

The laser driving signal outputting circuit 504 is a circuit for outputting the laser driving signal to the laser controller 505. The laser driving signal outputting circuit 504 outputs the laser driving signal to the laser controller 505 at the timing (delay time T+low-width time/2) described with reference to FIG. 3 using the low-width time inputted from the low-width time monitoring circuit 503. The laser driving signal outputting circuit 504 outputs the laser driving signal for driving the semiconductor laser of the semiconductor laser unit 1 on the basis of output timing of the BD detection signal and an output period in which the BD detection signal is outputted. The laser driving signal outputting circuit 504 uses falling timing of the BD detection signal inputted from the low-width time monitoring circuit 503 as a reference and outputs the laser driving signal on the basis of the low-width time inputted from the low-width time monitoring circuit 503. The laser controller 505 effects control of the semiconductor laser unit 1 and the reflecting device 5 on the basis of the laser driving signal inputted from the laser driving signal outputting circuit 504 and in synchronism the CLK signal inputted from the laser driving signal outputting circuit 504. The control effected by the laser controller 505 includes control of increasing and decreasing the rotational speed of the rotatable polygonal mirror 4 by the deflecting device 5 and control of turning on and off the semiconductor laser of the semiconductor laser unit 1.

(Control of Output Timing of Laser Driving Signal)

Next, control of the output timing of the laser driving signal in this embodiment will be described. As described above, the time in which the low-width time monitoring circuit 503 is capable of monitoring the low-width time is limited depending on the capacity of the memory 503b mounted in the low-width time monitoring circuit 503. A period from a state in which the rotatable polygonal mirror 4 rotates at a low speed to a state in which the rotatable polygonal mirror 4 rotates at a predetermined speed or more is assumed and when the capacity of the memory 503b mounted in the low-width time monitoring circuit 503 is determined, such a problem that a memory size considerably increases and thus a cost increases arises.

The time required for the passing of the spot S1, where the laser light flux L focuses, through the light receiving surface 10 of the BD sensor 6 described with reference to (b) of FIG. 2 depends on the scanning speed of the spot S1, i.e., the rotational speed of the rotatable polygonal mirror 4. With a slower rotational speed of the rotatable polygonal mirror 4, the time required for the passing of the spot S1 through the light receiving surface 10 becomes longer, and therefore the low-width time becomes long. In this embodiment, only when the rotational speed of the rotatable polygonal mirror 4 is the predetermined speed or more, the toner of the laser driving signal is timing determined by the low-width time on the basis of timing when the BD detection signal outputted from the BD sensor 6 falls from the high level to the low level. On the other hand, when the rotational speed of the rotatable polygonal mirror 4 is less than the predetermined speed, the output timing of the laser driving signal is determined by the timing when the BD detection signal outputted from the BD sensor 6 falls from the high level to the low level and timing determined by a fixed delay time T.

Figure 6:
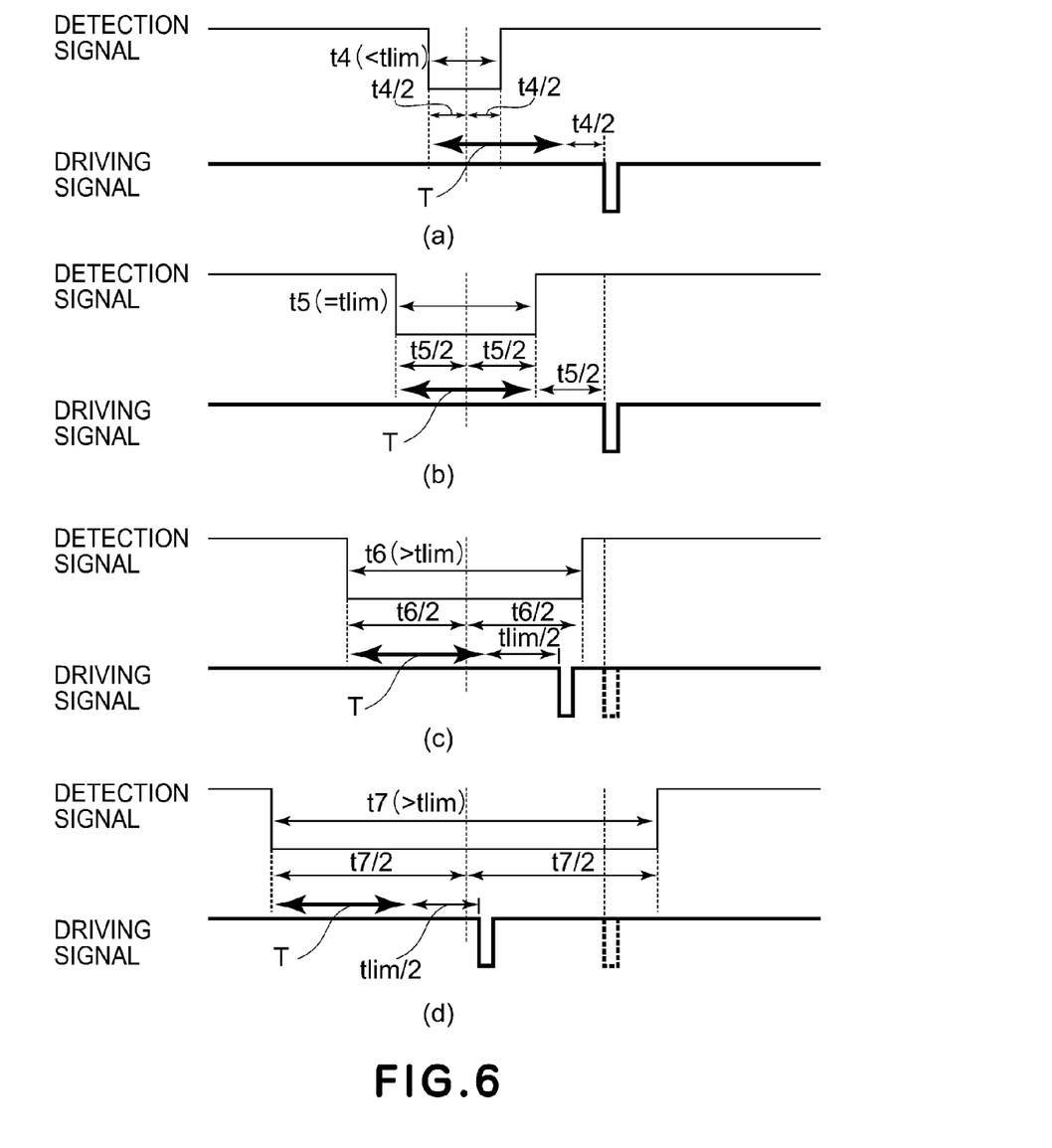

A specific example will be described using FIG. 6. A measurable maximum low-width time (first period) determined depending on the capacity of the memory 503b of the low-width time monitoring circuit 503 is represented by tlim. In each of (a) to (d) of FIG. 6, an upper portion shows the BD detection signal outputted from the BD sensor 6, and a lower portion shows the laser driving signal outputted from the laser driving signal outputting circuit 504, wherein the abscissa represents a time. In FIG. 6, (a) shows the case where a low-width time t4 is shorter than the maximum low-width time tlim (t4<tlim), (b) shows the case where a low-width time t5 is equal to the maximum low-width time tlim (t5=tlim), and (c) and (d) show the cases where the low-width times t6 and t7 are longer than the maximum low-width time tlim, respectively (t6>tlim, t7>tlim, respectively).

In the cases of (a) and (b) of FIG. 6, the output timing of the laser driving signal outputted from the laser driving signal outputting circuit 504 uses, as a reference, falling timing of the BD detection signal outputted from the BD sensor 6. The output timing of the laser driving signal is timing of a delay of the delay time T+(t4/2) in (a) of FIG. 6 and a delay of the delay time T+(t5/2) in (b) of FIG. 6 with respect to the falling timing of the BD detection signal. The output timing of the laser driving signal in each of (a) and (b) of FIG. 6 is similar to the output timing described with reference to FIG. 3, so that the laser driving signal is outputted after a lapse of the delay time T, which is a third time, on the basis of the center position of the BD detection signal.

On the other hand, in the cases of (c) and (d) of FIG. 6, the output timing of the laser driving signal outputted from the laser driving signal outputting circuit 504 uses, as a reference, the falling timing of the BD detection signal outputted from the BD sensor 6. However, the output timing of the laser driving signal is timing of "delay time T+(tlim/2)", which is a fixed second time, based on the falling timing of the BD detection signal. Specifically, in the case of (c) of FIG. 6, on the basis of the falling timing of the BD detection signal, the output timing is not timing of the delay time T+(t6/2), but is the timing of the delay time T+(tlim/2). Further, in the case of (d) of FIG. 6, on the basis of the falling timing of the BD detection signal, the output timing is not timing of the delay time T+(t7/2), but is the timing of the delay time T+(tlim/2). In this way, the fixed second period (T+(tlim/2)) is a value set in advance on the basis of the first period (tlim).

As described above, in the case where the maximum low-width time tlim measurable by the low-width time monitoring circuit 503 is not more than the low-width time, the laser driving signal is outputted at timing of a delay of a predetermined time from timing of the center position of the BD detection signal. In other words, in the case where the rotational speed of the rotatable polygonal mirror 4 is a rotational speed which is not less than the predetermined time, the laser driving signal is outputted at the timing of the delay of the predetermined time from the timing of the center position of the BD detection signal.

On the other hand, in the case where the maximum low-width time tlim measurable by the low-width time monitoring circuit 503 is longer than the low-width time, the laser driving signal is outputted at timing of a delay of a predetermined time (T+tlim/2) from the falling timing position of the BD detection signal. In other words, in the case where the rotational speed of the rotatable polygonal mirror 4 is a rotational speed which is less than the predetermined time, the laser driving signal is outputted at the timing of the delay of the predetermined time (T+tlim/2) from the falling timing of the BD detection signal. The falling timing of the BD detection signal is specifically timing depending on timing of start of the incidence of the laser light flux L on the light receiving surface 10 of the BD sensor 6. In this way, in the case where the low-width time which is the output period is longer than the maximum low-width time tlim which is the first period, the laser driving signal outputting circuit 504 outputs the laser driving signal on the basis of the output timing of the BD detection signal and the fixed second period.

The BD detection signal changes in low-width time, specifically becomes short in the order of (d), (c), (b) and (a) of FIG. 6 in which the rotational speed of the rotatable polygonal mirror 4 becomes higher. In the case where the rotational speed of the rotatable polygonal mirror 4 is accelerated to, e.g., a predetermined rotational speed required during image formation from a state in which the rotatable polygonal mirror 4 is at rest, first, the laser driving signal is outputted as shown in (d) of FIG. 6 and (c) of FIG. 6. In (d) and (c) of FIG. 6, on the basis of the falling timing of the BD detection signal, the laser driving signal is outputted, so that rotation control of the rotatable polygonal mirror 4 is effected. Then, when the rotational speed of the rotatable polygonal mirror 4 is the predetermined rotational speed or more, as shown in (b) and (a) of FIG. 6, the laser driving signal is outputted on the basis of the timing of the center position of the BD detection signal, so that the rotation control of the rotatable polygonal mirror 4 is effected. In the case of control processing when the rotational speed of the rotatable polygonal mirror 4 is decreased, an operation reverse to the above-described operation is performed.

By the above-described operation, from the state of the slow rotational speed of the rotatable polygonal mirror 4 to the state of not less than the predetermined rotational speed of the rotatable polygonal mirror 4, it is possible to effect smooth control of increasing and decreasing the rotational speed of the rotatable polygonal mirror 4. Further, in the case where the rotational speed of the rotatable polygonal mirror 4 is not less than the predetermined rotational speed, even in a state in which the BD incident light quantity varies, it is possible to stably effect control at a predetermined rotational speed without being subjected to the influence of the variation. For example, the maximum low-width time tlim measurable by the low-width time monitoring circuit 503 is determined so that stable control can be effected only at the rotational speed of the rotatable polygonal mirror 4 when the image is formed on the recording material P by the image forming apparatus. As a result, the capacity of the memory 503b mounted in the low-width time monitoring circuit 503 can be designed as a minimum necessary capacity.

As described above, by employing the constitution in this embodiment, even in the case where the quality of the light entering the BD sensor 6 causes a variation, with simple control and an inexpensive constitution, the rotation of the rotatable polygonal mirror 4 can be controlled so as not to adversely affect the image formation. In this way, according to this embodiment, the rotational speed control of the rotatable polygonal mirror of the scanning optical device can be effected from a low speed to a high speed without increasing the capacity of the storing means and with a simple constitution.

Embodiment 2

In Embodiment 2, constitutions of the image forming apparatus 100, the scanning optical device 101 and the laser control portion 510 are similar to those described in Embodiment 1, and constituent elements are represented by the same reference numerals or symbols and will be omitted from description. A method when the output timing of the laser driving signal by the laser driving signal outputting circuit 504 in this embodiment is determined is the same as that in Embodiment 1 in the case where the low-width time of the BD detection signal is not more than the maximum low-width time tlim by which the low-width time is measurable. In this embodiment, the operation in the case where the low-width time is longer than the maximum low-width time tlim is different from that in Embodiment 1. In this embodiment, in the case where the low-width time exceeds the maximum low-width time tlim, irrespective of the low-width time, on the basis of rising timing of the BD detection signal, the laser driving signal is outputted at timing of a delay of a predetermined time. The rising timing of the BD detection signal is specifically timing depending on timing of end of the incidence of the laser light flux L on the light receiving surface 10 of the BD sensor 6.

(Control of Output Timing of Laser Driving Signal)

Figure 7:
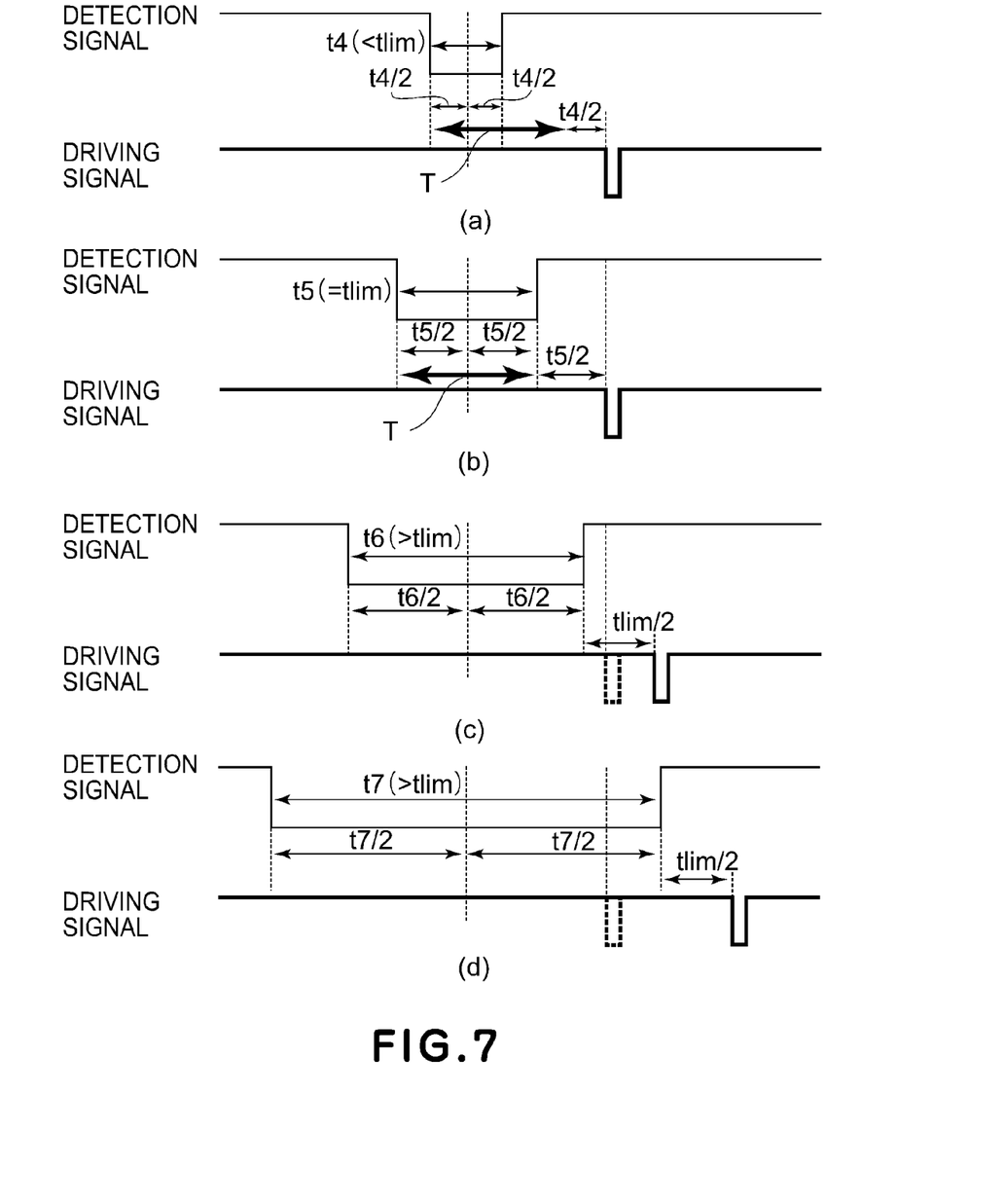

A relationship between the BD detection signal and the laser driving signal in this embodiment will be described using (a) to (d) of FIG. 7. In FIG. 7, (a) shows the case where a low-width time t4 is shorter than the maximum low-width time tlim (t4<tlim), (b) shows the case where a low-width time t5 is equal to the maximum low-width time tlim (t5=tlim), and (c) and (d) show the cases where the low-width times t6 and t7 are longer than the maximum low-width time tlim, respectively (t6>tlim, t7>tlim, respectively).

In the cases of (a) and (b) of FIG. 7, the output timing of the laser driving signal outputted from the laser driving signal outputting circuit 504 uses, as a reference, falling timing of the BD detection signal outputted from the BD sensor 6. The output timing of the laser driving signal is timing of a delay of the delay time T+(t4/2) in (a) of FIG. 7 and a delay of the delay time T+(t5/2) in (b) of FIG. 7 on the basis of the falling timing of the BD detection signal. The output timing of the laser driving signal in each of (a) and (b) of FIG. 7 is similar to the output timing described with reference to (a) and (b) of FIG. 6, so that the laser driving signal is outputted after a lapse of the delay time T on the basis of the center position of the BD detection signal.

On the other hand, in the cases of (c) and (d) of FIG. 7, the output timing of the laser driving signal outputted from the laser driving signal outputting circuit 504 uses, as a reference, the rising timing of the BD detection signal outputted from the BD sensor 6. The output timing of the laser driving signal is timing of a delay of "time tlim/2", which is a fixed second time, based on the rising timing of the BD detection signal. In this way, the fixed second period (tlim/2) is a value set in advance on the basis of the first period (tlim).

As described above, in this embodiment, in the case where the low-width time is not more than the maximum low-width time tlim measurable by the low-width time monitoring circuit 503, the laser driving signal is outputted at timing of a delay of a predetermined time (T) from timing of the center position of the BD detection signal.

On the other hand, in the case where the maximum low-width time tlim measurable by the low-width time monitoring circuit 503 is longer than the low-width time, the laser driving signal is outputted at timing of a delay of a predetermined time (tlim/2) from the rising timing position of the BD detection signal.

By the above-described operation, from the state of the slow rotational speed of the rotatable polygonal mirror 4 to the state of not less than the predetermined rotational speed of the rotatable polygonal mirror 4, it is possible to effect smooth control of increasing and decreasing the rotational speed of the rotatable polygonal mirror 4. Further, in the case where the rotational speed of the rotatable polygonal mirror 4 is not less than the predetermined rotational speed, even in a state in which the BD incident light quantity varies, it is possible to stably effect control at a predetermined rotational speed without being subjected to the influence of the variation.

As described above, by the constitution in this embodiment, even in the case where the quality of the light entering the BD sensor 6 causes a variation, with simple control and an inexpensive constitution, the rotation of the rotatable polygonal mirror 4 can be controlled so as not to adversely affect the image formation. In this way, according to this embodiment, the rotational speed control of the rotatable polygonal mirror of the scanning optical device can be effected from a low speed to a high speed without increasing the capacity of the storing means and with a simple constitution.

Embodiment 3

Laser Driving Signal

Figure 8:
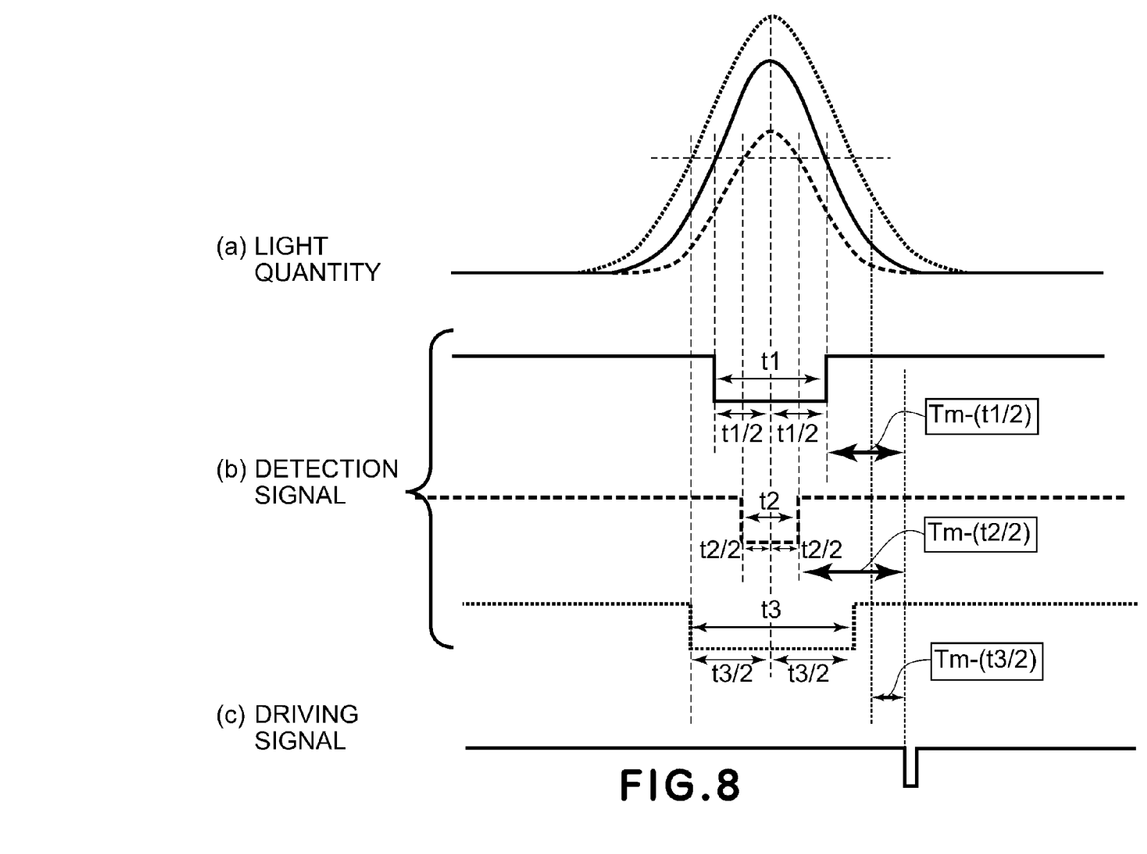
FIG. 8 is a timing chart showing a BD incident light quantity ((a)), a BD detection signal ((b)) and a laser driving signal ((c)) in Embodiments 3 and 4.

In Embodiment 3, constitutions of the image forming apparatus 100, the scanning optical device 101 and the laser control portion 510 are similar to those described in Embodiment 1, and constituent elements are represented by the same reference numerals or symbols and will be omitted from description. FIG. 8 shows a relationship among three parameters of a BD incident light quantity ((a)), a BD detection signal ((b)) and a laser driving signal ((c)) in this embodiment. In this embodiment, a method for determining the output timing of the laser driving signal outputted from the laser driving signal outputting circuit 504 is different from that in Embodiment 1. In this embodiment, the output timing of the laser driving signal is determined from the falling timing, the rising timing, the low-width time and a delay time Tm of the BD detection signal outputted from the BD sensor 6. In this embodiment, on the basis of the rising timing of the BD detection signal outputted from the BD sensor 6, the laser driving signal is outputted at timing of a delay of a time obtained by subtracting half of a measured low-width time from the delay time Tm.

The output timing of the laser driving signal represented by each of the solid line, the broken line and the dotted line in (a) and (b) of FIG. 8 is determined in the following manner. In the case where the BD incident light quantity is represented by the solid line, the laser driving signal is outputted after a lapse of the delay time Tm+(t1/2) from the rising timing of the BD detection signal indicated by the solid line. In the case where the BD incident light quantity is represented by the broken line, the laser driving signal is outputted after a lapse of the delay time Tm+(t2/2) from the rising timing of the BD detection signal indicated by the broken line. In the case where the BD incident light quantity is represented by the dotted line, the laser driving signal is outputted after a lapse of the delay time Tm+(t3/2) from the rising timing of the BD detection signal indicated by the dotted line.

Similarly as in Embodiment 1, each of the BD incident light quantity indicated by the solid line, the broken line and the dotted line and the delay time of the laser driving signal determined from the associated BD incident light quantity is the same timing when the predetermined delay time Tm, which is the third time, elapsed from a central position of the associated incident light quantity. That is, at the timing when the delay time T elapsed from the central position of the incident light quantity, the laser driving signal is outputted, so that irrespective of a magnitude of the BD incident light quantity, the laser driving signal can be outputted. As shown in (c) of FIG. 8, the laser driving signal to be outputted from the laser driving signal outputting circuit 504 is outputted with a predetermined delay time (Tm) from a central position of the BD incident light quantity irrespective of the magnitude of the BD incident light quantity.

(Control of Output Timing of Laser Driving Signal)

Figure 9:
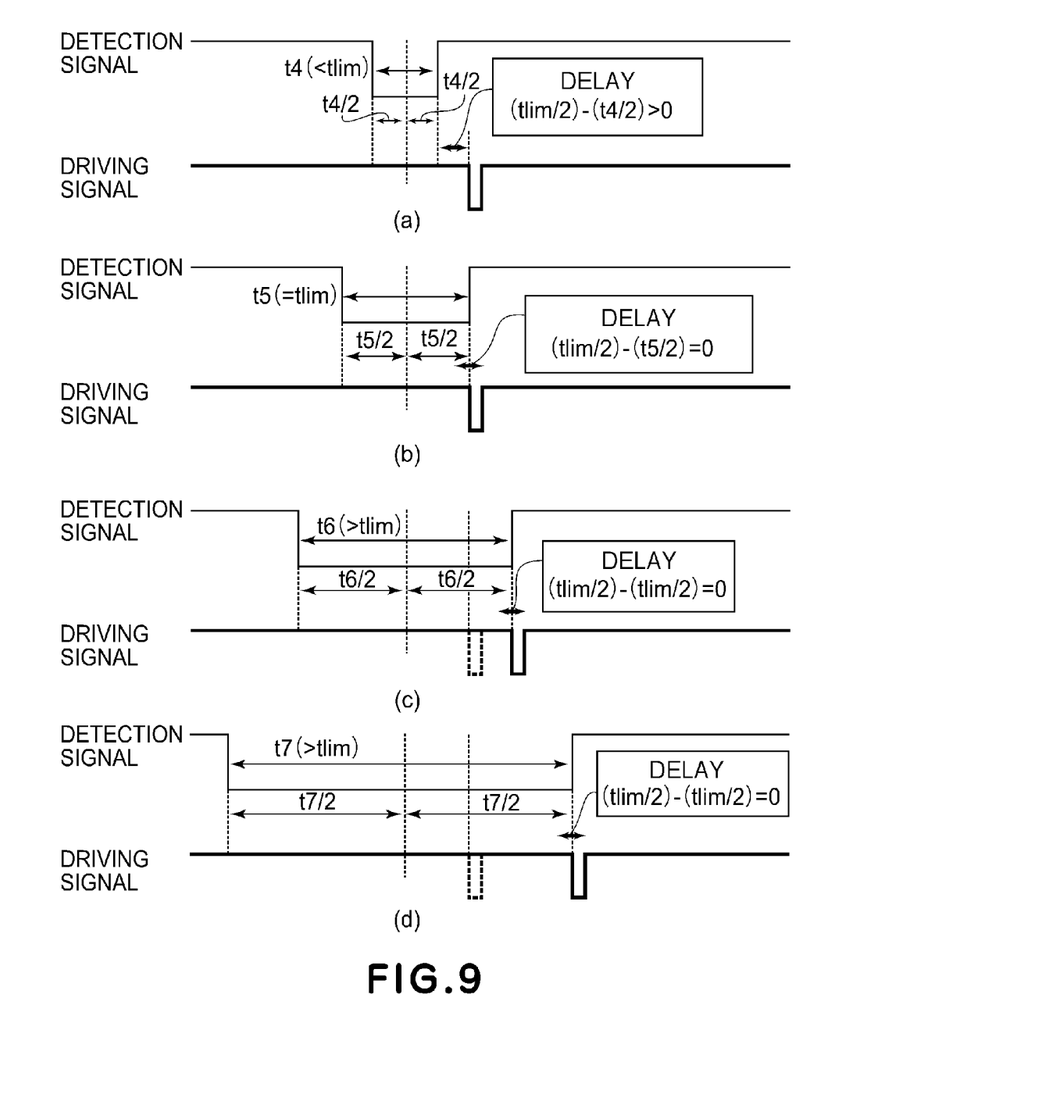

A specific example will be described using FIG. 9. The delay time Tm is set at a value of half of the maximum low-width time by which the low-width time is measurable (Tm=tlim/2). In this embodiment, the delay time Tm is the value of half of the maximum low-width time tlim, but may also be another value unless a value obtained by subtracting the value of half of the maximum low-width time tlim from the delay time Tm is negative. In FIG. 9, (a) shows the case where a low-width time t4 is shorter than the maximum low-width time tlim (t4<tlim), (b) shows the case where a low-width time t5 is equal to the maximum low-width time tlim (t5=tlim), and (c) and (d) show the cases where the low-width times t6 and t7 are longer than the maximum low-width time tlim, respectively (t6>tlim, t7>tlim, respectively).

In the cases of (a) and (b) of FIG. 9, the output timing of the laser driving signal outputted from the laser driving signal outputting circuit 504 uses, as a reference, rising timing of the BD detection signal outputted from the BD sensor 6. In the case of (a) of FIG. 9, the output timing of the BD detection signal is timing of a delay of (tlim/2)−(t4/2) (=Tm−(t4/2)) on the basis of the rising timing of the BD detection signal outputted from the BD sensor 6. In the case of (b) of FIG. 9, the output timing of the BD detection signal is timing of a delay of (tlim/2)−(t5/2) (=Tm−(t5/2)) on the basis of the rising timing of the BD detection signal. Incidentally, in the case of (b) of FIG. 9, the laser driving signal is outputted at the rising timing of the BD detection signal, i.e., is outputted with a delay amount of 0, but for convenience of explanation, an arrow is illustrated with a certain width.

In the cases of (c) and (d) of FIG. 9, the low-width time monitoring circuit 503 cannot measure the low-width time of the BD detection signal longer than the maximum low-width time tlim, and therefore the laser driving signal is outputted at the following timing. That is, in the cases of (c) and (d) of FIG. 9, the output timing of the laser driving signal is timing of a delay of "delay time Tm (=tlim/2)−(tlim/2) (=0)", which is the fixed second period, on the basis of the rising timing of the BD detection signal. In this way, the fixed second period (Tm−(tlim/2)) is a value set in advance on the basis of the first period (tlim). In each of the cases of (c) and (d) of FIG. 9, the laser driving signal is outputted at the rising timing of the BD detection signal, i.e., is outputted with the delay amount of 0, but for convenience of explanation, the arrows in (c) and (d) of FIG. 9 are illustrated with a certain width.

As described above, in the case where the low-width time is not more than the maximum low-width time tlim measurable by the low-width time monitoring circuit 503, the laser driving signal is outputted at timing of a delay of a predetermined time (Tm) from timing of the center position of the BD detection signal. In other words, in the case where the rotational speed of the rotatable polygonal mirror 4 is a rotational speed which is not less than the predetermined time (Tm), the laser driving signal is outputted at the timing of the delay of the predetermined time from the timing of the center position of the BD detection signal. On the other hand, in the case where the maximum low-width time tlim measurable by the low-width time monitoring circuit 503 is longer than the low-width time, the laser driving signal is outputted at timing of a delay of a predetermined time (Tm−tlim/2) from the rising timing position of the BD detection signal. In other words, in the case where the rotational speed of the rotatable polygonal mirror 4 is a rotational speed which is less than the predetermined time, the laser driving signal is outputted at the timing of the delay of the predetermined time (Tm−tlim/2) from the rising timing of the BD detection signal.

By the above-described operation, from the state of the slow rotational speed of the rotatable polygonal mirror 4 to the state of not less than the predetermined rotational speed of the rotatable polygonal mirror 4, it is possible to effect smooth control of increasing and decreasing the rotational speed of the rotatable polygonal mirror 4. Further, in the case where the rotational speed of the rotatable polygonal mirror 4 is not less than the predetermined rotational speed, even in a state in which the BD incident light quantity varies, it is possible to stably effect control of the rotational speed of the rotatable polygonal mirror 4 at a predetermined rotational speed without being subjected to the influence of the variation.

As described above, by employing the constitution in this embodiment, even in the case where the quality of the light entering the BD sensor 6 causes a variation, with simple control and an inexpensive constitution, the rotation of the rotatable polygonal mirror 4 can be controlled so as not to adversely affect the image formation. In this way, according to this embodiment, the rotational speed control of the rotatable polygonal mirror of the scanning optical device can be effected from a low speed to a high speed without increasing the capacity of the storing means and with a simple constitution.

Embodiment 4

In Embodiment 4, constitutions of the image forming apparatus 100, the scanning optical device 101 and the laser control portion 510 are similar to those described in Embodiment 1, and constituent elements are represented by the same reference numerals or symbols and will be omitted from description. Also in this embodiment, similarly as in Embodiment 3, the delay time Tm is half (tlim/2) of the maximum low-width time by which the delay time Tm is measurable. The method for determining the output timing of the laser driving signal in this embodiment is the same as that in Embodiment 3 in the case where the low-width time of the BD detection signal is not more than the maximum low-width time by which the low-width time is measurable. In this embodiment, an operation in the case where the low-width time is longer than the maximum low-width time tlim is different from that in Embodiment 3. In this embodiment, a constitution in which the laser driving signal is outputted at a time when the low-width time started to be counted from the falling timing of the BD detection signal exceeds the maximum low-width time tlim is employed.

(Control of Output Timing of Laser Driving Signal)

Figure 10:
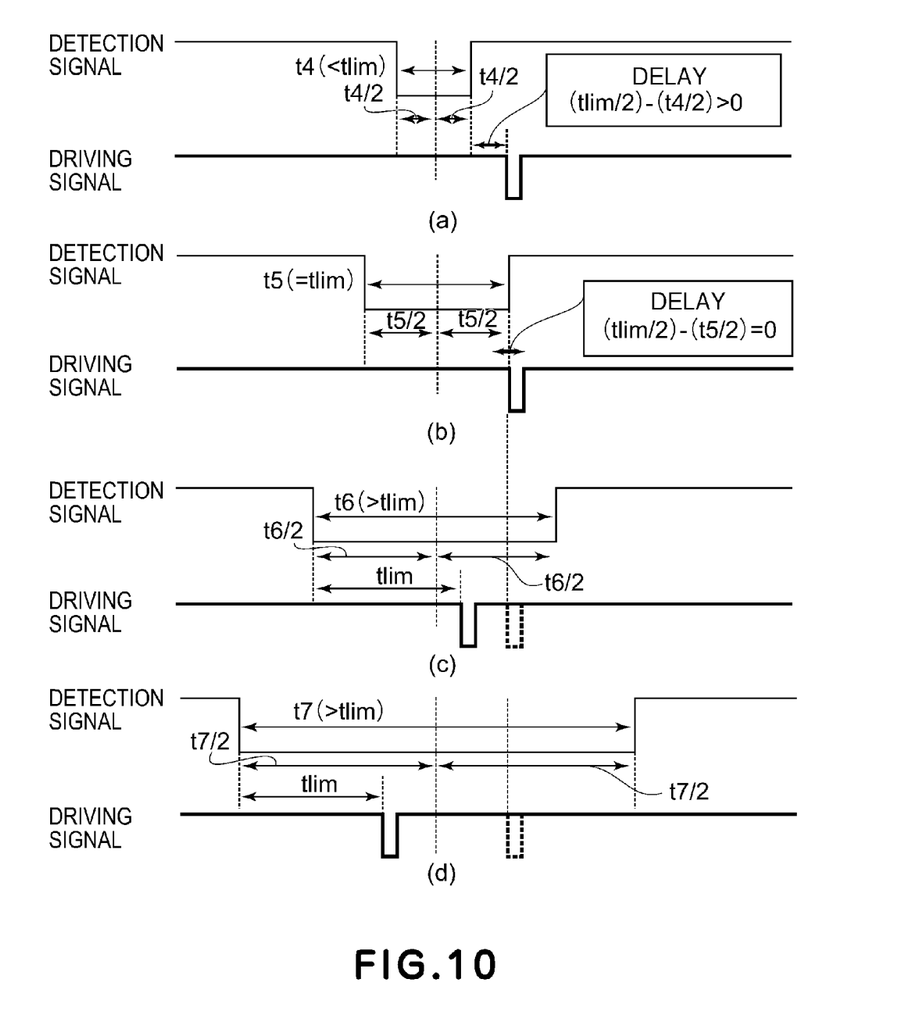

Using (a) to (d) of FIG. 10, a relationship the BD detection signal and the laser driving signal in this embodiment will be described. In FIG. 10, (a) shows the case where a low-width time t4 is shorter than the maximum low-width time tlim (t4<tlim), (b) shows the case where a low-width time t5 is equal to the maximum low-width time tlim (t5=tlim), and (c) and (d) show the cases where the low-width times t6 and t7 are longer than the maximum low-width time tlim, respectively (t6>tlim, t7>tlim, respectively).

In the cases of (a) and (b) of FIG. 10, the output timing of the laser driving signal outputted from the laser driving signal outputting circuit 504 uses, as a reference, rising timing of the BD detection signal outputted from the BD sensor 6. In (a) of FIG. 10, the output timing of the BD detection signal is timing of a delay of (tlim/2)−(t4/2) (=Tm−(t4/2)) on the basis of the rising timing of the BD detection signal outputted from the BD sensor 6. In of FIG. 10, the output timing of the BD detection signal is timing of a delay of (tlim/2)–(t5/2) (=Tm–(t5/2)) on the basis of the rising timing of the BD detection signal. Incidentally, in the case of (b) of FIG. 10, the laser driving signal is outputted at the rising timing of the BD detection signal, i.e., is outputted with a delay amount of 0, but for convenience of explanation, an arrow is illustrated with a certain width.

On the other hand, in the cases of (c) and (d) of FIG. 10, the output timing of the laser driving signal is timing elapsed from the falling timing of the BD detection signal by the maximum low-width time tlim which is the fixed second period. This timing is timing when the counting of the low-width time by the low-width time monitoring circuit 503 cannot be made. That is, the output timing of the laser driving signal timing of a lapse of tlim, which is the fixed second period, from the falling timing of the BD detection signal. In this way, the fixed second period (tlim) is a value set in advance on the basis of the first period (tlim).

As described above, in the case where the low-width time is not more than the maximum low-width time tlim measurable by the low-width time monitoring circuit 503, the laser driving signal is outputted at timing of a delay of a predetermined time (Tm) from timing of the center position of the BD detection signal. In other words, in the case where the rotational speed of the rotatable polygonal mirror 4 is a rotational speed which is not less than the predetermined time (Tm), the laser driving signal is outputted at the timing of the delay of the predetermined time from the timing of the center position of the BD detection signal. On the other hand, in the case where the maximum low-width time tlim measurable by the low-width time monitoring circuit 503 is longer than the low-width time, the laser driving signal is outputted at timing of a delay of a predetermined time (tlim) from the falling timing position of the BD detection signal. In other words, in the case where the rotational speed of the rotatable polygonal mirror 4 is a rotational speed which is less than the predetermined time, the laser driving signal is outputted at the timing of the delay of the predetermined time (tlim) from the falling timing of the BD detection signal.

By the above-described operation, from the state of the slow rotational speed of the rotatable polygonal mirror 4 to the state of not less than the predetermined rotational speed of the rotatable polygonal mirror 4, it is possible to effect smooth control of increasing and decreasing the rotational speed of the rotatable polygonal mirror 4. Further, in the case where the rotational speed of the rotatable polygonal mirror 4 is not less than the predetermined rotational speed, even in a state in which the BD incident light quantity varies, it is possible to stably effect control of the rotational speed of the rotatable polygonal mirror 4 at a predetermined rotational speed without being subjected to the influence of the variation.

As described above, in this embodiment, even in the case where the quality of the light entering the BD sensor 6 causes a variation, with simple control and an inexpensive constitution, the rotational speed of the rotatable polygonal mirror 4 can be controlled so as not to adversely affect the image formation. In this way, according to this embodiment, the rotational speed control of the rotatable polygonal mirror of the scanning optical device can be effected from a low speed to a high speed without increasing the capacity of the storing means and with a simple constitution.

According to the present invention, control of the rotational speed of the rotatable polygonal mirror of the scanning optical device can be effected in a broad range from the low speed to the high speed without increasing the capacity of the storing means and with a simple constitution.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-244158 filed on Dec. 2, 2014, which is hereby incorporated by reference herein in its entirety.

What is claimed is:

1. A scanning optical device comprising:
   a light source for emitting laser light;
   a rotatable polygonal mirror for deflecting the laser light emitted from said light source;
   a detecting portion for outputting a detection signal on the basis of incidence of the laser light deflected by said rotatable polygonal mirror on a light receiving surface; and
   an outputting portion for outputting a driving signal for driving said light source on the basis of output timing of the detection signal and an output period in which the detection signal is outputted, wherein the laser light is emitted depending on an image signal inputted at timing based on output timing of the driving signal,
   wherein when the output period is longer than a first period, said outputting portion outputs the driving signal on the basis of the output timing of the detection signal and a fixed second period.

2. A scanning optical device according to claim 1, wherein when the output period is longer than the first period, on the basis of timing depending on timing when the incidence of the laser light on the light receiving surface is started, said outputting portion outputs the driving signal at timing of elapse of the fixed second period.

3. A scanning optical device according to claim 2, further comprising:
   a measuring portion for measuring the output period; and
   a storing portion used for measuring the output period by said measuring portion,
   wherein the first period is determined depending on capacity of said storing portion.

4. A scanning optical device according to claim 1, wherein when the output period is longer than the first period, on the basis of timing depending on timing when the incidence of the laser light on the light receiving surface is ended, said outputting portion outputs the driving signal at timing of elapse of the fixed second period.

5. A scanning optical device according to claim 3, further comprising:
   a measuring portion for measuring the output period; and
   a storing portion used for measuring the output period by said measuring portion,
   wherein the first period is determined depending on capacity of said storing portion.

6. A scanning optical device according to claim 1, wherein when the output period is shorter than the first period, on the basis of timing depending on timing when the incidence of the laser light on the light receiving surface is started, said outputting portion outputs the driving signal at timing of elapse of a predetermined third period and half of the output period.

7. A scanning optical device according to claim 1, wherein the output period varies depending on a light quantity of the laser light emitted from said light source.

8. A scanning optical device according to claim 1, wherein the output period is a period from timing when a light quantity of the laser light is not less than a threshold to time when the light quantity of the laser light is less than the threshold.

9. A scanning optical device according to claim 1, further comprising:
- a driving portion for driving said rotatable polygonal mirror; and
- a controller for controlling a rotational speed of said rotatable polygonal mirror,
- wherein said controller controls the rotational speed of said rotatable polygonal mirror depending on a cycle of the detection signal outputted from said outputting portion.

10. A scanning optical device according to claim 9, wherein when the cycle of the detection signal is longer than a predetermined cycle, the rotational speed of said rotatable polygonal mirror is increased, and when the cycle of the detection signal is shorter than the predetermined cycle, the rotational speed of said rotatable polygonal mirror is decreased.

11. An image forming apparatus comprising:
- an scanning optical device according to claim 1;
- an image bearing member for forming a latent image by being irradiated with the laser light emitted from said scanning optical device on the basis of the image signal;
- a developing portion for developing the latent image formed on said image bearing member to form a toner image; and
- a transfer portion for transferring the toner image formed by said developing portion onto a recording material.

\* \* \* \* \*